United States Patent
Zikeli et al.

(10) Patent No.: US 10,323,191 B2
(45) Date of Patent: Jun. 18, 2019

(54) PRESSURE-CONTROLLED REACTOR

(71) Applicant: AUROTEC GMBH, Voecklabruck (AT)

(72) Inventors: Stefan Zikeli, Regau (AT); Friedrich Ecker, Timelkam (AT)

(73) Assignee: AUROTEC GMBH, Voecklabruck (AT)

( * ) Notice: Subject to any disclaimer, the term of this patent is extended or adjusted under 35 U.S.C. 154(b) by 868 days.

(21) Appl. No.: 14/389,062

(22) PCT Filed: Mar. 26, 2013

(86) PCT No.: PCT/EP2013/056395
§ 371 (c)(1),
(2) Date: Sep. 29, 2014

(87) PCT Pub. No.: WO2013/144140
PCT Pub. Date: Oct. 3, 2013

(65) Prior Publication Data
US 2015/0122802 A1    May 7, 2015

(30) Foreign Application Priority Data
Mar. 28, 2012   (EP) .................................... 12161724

(51) Int. Cl.
*H05B 6/10* (2006.01)
*H05B 6/02* (2006.01)
(Continued)

(52) U.S. Cl.
CPC ........... *C10B 19/00* (2013.01); *B01J 19/2425* (2013.01); *C01C 3/0204* (2013.01); *C10B 31/00* (2013.01);
(Continued)

(58) Field of Classification Search
CPC .......... B01J 19/2425; B01J 2219/00094; B01J 2219/00139; B01J 2219/00162;
(Continued)

(56) References Cited

U.S. PATENT DOCUMENTS

| 4,224,298 A | * | 9/1980 | Robinson ................. B01J 8/062 |
|             |   |        |                        252/373 |
| 4,693,877 A |   | 9/1987 | Oehsen et al. |

(Continued)

FOREIGN PATENT DOCUMENTS

| CN | 1739847 | 3/2006 |
| CN | 101952201 A | 1/2011 |

(Continued)

OTHER PUBLICATIONS

Notice of Examination Opinion for Taiwanese Patent Application No. 102118864 dated Jul. 4, 2016.
(Continued)

*Primary Examiner* — Sang Y Paik
(74) *Attorney, Agent, or Firm* — Greer, Burns & Crain, Ltd.

(57) ABSTRACT

A method is provided for the pyrolysis or thermolysis of a fluid or fluidized starting material in a tube bundle reactor including a plurality of heatable reactor tubes. The method includes feeding the starting material to the tube bundle reactor at one end by at least one supply line; wherein the supply line has several pressure reduction units which enable a positive pressure before the starting material is introduced into individual reactor tubes of the tube bundle reactor and a negative pressure inside the reactor tubes. The pressure reduction units control a substantially equal inflow of the starting material into individual reactor tubes and the reactor tubes are heated to a decomposition temperature of the starting material in at least one primary section. The starting material is pyrolyzed or thermolyzed and a pyrolysis or thermolysis product is obtained.

27 Claims, 7 Drawing Sheets

(51) Int. Cl.
    *B01J 8/10*     (2006.01)
    *C10B 19/00*    (2006.01)
    *B01J 19/24*    (2006.01)
    *C01C 3/02*     (2006.01)
    *C10B 31/00*    (2006.01)
    *C10B 31/12*    (2006.01)
    *C10B 47/40*    (2006.01)
    *F27D 11/06*    (2006.01)

(52) U.S. Cl.
    CPC .............. *C10B 31/12* (2013.01); *C10B 47/40* (2013.01); *F27D 11/06* (2013.01); *B01J 2219/00094* (2013.01); *B01J 2219/00139* (2013.01); *B01J 2219/00162* (2013.01); *B01J 2219/00164* (2013.01)

(58) Field of Classification Search
    CPC .......... B01J 2219/00164; C01C 3/0204; C10B 31/12; C10B 47/40; C10B 19/00; C10B 31/00; F27D 11/06
    USPC ................. 219/601, 607, 628–630; 422/600, 422/630–649; 110/229, 235–254
    See application file for complete search history.

(56)           References Cited

U.S. PATENT DOCUMENTS

| 5,324,904 | A  | * | 6/1994  | Cresswell ............ B01J 19/0013 |
|           |    |   |         | 219/618 |
| 7,951,978 | B2 |   | 5/2011  | Arita et al. |
| 8,802,202 | B2 |   | 8/2014  | Neogi et al. |
| 2002/0031690 | A1 | * | 3/2002 | Shimazu ................. B01B 1/005 |
|           |    |   |         | 429/425 |
| 2004/0250868 | A1 |   | 12/2004 | Yada et al. |
| 2010/0284889 | A1 |   | 11/2010 | Boehling et al. |
| 2010/0316552 | A1 |   | 12/2010 | Boehling et al. |
| 2011/0306788 | A1 |   | 12/2011 | Tanimoto et al. |
| 2012/0157719 | A1 |   | 6/2012  | Teles et al. |

FOREIGN PATENT DOCUMENTS

| DE | 4128827 A1    | 3/1993  |
| DE | 69215358      | 6/1997  |
| GB | 1593473       | 7/1981  |
| JP | S62-136548 U  | 8/1987  |
| JP | H02-056238 A  | 2/1990  |
| JP | 2000026363    | 1/2000  |
| JP | 2002191962 A  | 7/2002  |
| JP | 2009-297607 A | 12/2009 |
| JP | 2011069296 A  | 4/2011  |
| WO | 2010083978 A2 | 7/2010  |
| WO | 2011089209 A2 | 7/2011  |

OTHER PUBLICATIONS

Japanese Examination Report for Japanese Patent Application No. 2015-502301 dated Oct. 28, 2016.

Japanese Office Action from corresponding Japanese Patent Application No. 2015-502301, dated Jul. 21, 2017 (with German Translation).

European Office Action from corresponding European Patent Application No. 13712267.7, dated Jul. 16, 2018.

* cited by examiner

PRESSURE-CONTROLLED REACTOR

BACKGROUND

The present invention relates to methods and apparatus for chemical reactions in heated reactors at negative pressure.

The publication WO 2010/083978 A2 describes a tube bundle reactor consisting of a plurality of heatable reactor tubes. The reactor has a homogenization plate with holes or channels for storing the reaction mixture before entry into the tube bundle. Each hole or each channel has the same dimensions.

EP 363 066 51 describes an inductively heatable reactor for fluid phase reaction processes, in particular for high-temperature pyrolysis of chlorodifluoromethane, which consists of a material block having a plurality of reactor tubes, where the material block can be inductively heated.

DE 27 12 728 A1 describes a tubular reactor for heating gases or vapours in which these gases or vapour are passed through a packing of electrically conducting bodies which are heated by electromagnetic induction.

DE 10 2007 034 715 A1 describes a method for producing hydrogen cyanide by the Andrussow method in which methane and ammonia are reacted at positive pressure to give hydrogen cyanide and water. For this purpose the reactor contains a gas supply line, a mixing layer, which can bring about a pressure drop, a catalyst layer and optionally a downstream heat exchanger for removing the heat.

US 2011/306788 describes a method for oxidizing organic molecules by heating the gas with the starting material in a catalyst-filled tube reactor. Various starting materials can be oxidized in this reactor, e.g. propylene, isobutylene, tert-butanol, methyl-tert-butylether, acrolein and methacrolein.

The publication U.S. Pat. No. 7,951,978 B2 relates to methods for producing acrolein from glycerin gas at pressures of 0.01 to 30 kPa by contact with a solid catalyst at temperatures of 200° C. to 550° C.

DS 3525749 A1 describes the BASF method for obtaining hydrocyanic acid by thermolysis of formamide at negative pressure.

WO 2009/062681 describes the production of hydrocyanic acid by catalytic dehydration (thermolysis) of gaseous formamide. The reactor for the dehydration has layers constructed in layer form with a plurality of reaction channels arranged in a cross manner, wherein the reactor has an inner surface which contains an iron fraction of more than 50 wt. %. The reaction channel has an average hydraulic diameter of 1 to 6 mm, where no additional catalysts and/or inserts are provided. The disadvantage of this design is that each channel is loaded with formamide in different quantities with the result that as a result of concentration differences, different products and by-products are formed.

The publication WO 2009/062897 describes a method for producing hydrocyanic acid by evaporating formamide in an evaporator and catalytic dehydration of the gaseous formamide. In this case, the evaporator was optimized for a performance of 10 to 2000 MW/m$^3$.

DE 69215358 T2 describes an electrically heatable thermolysis reactor for the decomposition of exhaust gases at negative pressure.

A number of continuously operated chemical reactors for positive or negative pressure reactions are therefore known. However, usual pressure controls of conventional reactors for continuous operation have in common that in particular when using multiple reactors, a non-uniform introduction of the starting materials into the reactor can be the consequence. As a result, particularly in the case of short dwell times of continuous-flow reactors differences can occur in the reaction and the type of chemical reactions taking place to give by-products. This has a negative influence on the product quality and quantity since optimizations of quantities, flow rate, pressure and temperature parameters become difficult.

SUMMARY

It is an object of the present invention to provide improved methods for pyrolysis or thermolysis in reactors which delivers homogeneous products.

The present invention relates to a method for the pyrolysis or thermolysis of a fluid or fluidized starting material at negative pressure in a tube bundle reactor consisting of a plurality of heatable reactor tubes, wherein the starting material is fed to the tube bundle reactor at one end by means of at least one supply line, wherein the supply line has several pressure reduction units. The pressure reduction units enable or bring about a positive pressure before the starting material is introduced into individual reactor tubes of the tube bundle reactor and an associated negative pressure inside the reactor tubes. According to the invention, the pressure reduction units control a substantially equal inflow of the starting material into individual reactor tubes. This means, for example, that all the reactor tubes are uniformly loaded and have the same throughput of starting material. As a result during the pyrolysis or thermolysis, the starting material is decomposed uniformly in all the tubes without an above-average high throughput taking place in some of the tubes or high starting material concentrations occurring, which lead to intensified formations of by-products (e.g. condensation or polymerization products). According to the invention, the reactor tubes are heated to a decomposition temperature of the starting material in at least one primary section, whereby the starting material is pyrolyzed or thermolyzed and a pyrolysis or thermolysis product is obtained.

In a further aspect, the invention relates to a device suitable for carrying out this method comprising a pyrolysis or thermolysis reactor having a reactor bundle of a plurality of reactor tubes, having a starting material supply line which is connected to the individual reactor tubes via a pressure reduction unit, wherein the reactor tubes are heatable and wherein the inside of the reactor tubes is operatively connected to a negative pressure pump, wherein the pressure reduction units control a substantially equal inflow of the starting material into individual reactors. This reactor is preferably used in the method according to the invention. The following more detailed description relates both to the method in which the device can be used and also to the device which is suitable or adapted for the described method and process parameters.

The pyrolysis or thermolysis can take place catalytically e.g. at iron-containing surfaces, e.g. iron or an iron alloy or iron oxide. The pyrolysis or thermolysis can be a dehydration. For example, a dehydration of glycerin as starting material is possible. The dehydration of glycerin can be used to obtain acrolein. In one example, the starting material is a carboxylic acid amide such as formamide which can be thermolyzed to give hydrocyanic acid. The invention therefore especially relates to a method for the thermolysis of a carboxylic acid amide, e.g. of formamide to form HCN in a tube bundle reactor with a plurality of reactor tubes, whereby in a first series of process steps formamide is brought in contact with heated surfaces of the reactor, whereby the plurality of reactor tubes of the tube bundle reactor are loaded with equal quantities of formamide by pressure regulation, wherein on the heated surfaces carboxylic acid amide is heated to its decomposition temperature and HCN gas is continuously removed.

The present invention is further defined as specified in the claims.

According to the invention, a tube bundle reactor is used for pyrolysis or thermolysis of the starting material (e.g. carboxylic acid amide). A tube bundle reactor consists of a plurality of reactor tubes which in total have a large surface area and nevertheless allow a high throughput of the starting material. A tube bundle reactor can, for example, consists of 2, 3, 4, 5, 6, 7, 8, 9, 10, 11, 12, 13, 14, 15, 16 or more individual tubes or reactor tubes. Preferably the multi-tube reactor consists of 10 to 200, particularly preferably 15 to 150, especially preferably 20 to 100, particularly preferably 30 to 80 individual tubes or reactor tubes. The reactor tubes can be separate tubes or longitudinally interconnected, e.g. received in a common material block. Preferably the tubes are spaced apart, e.g. with a distance of 1 mm to 5 mm from one another.

According to the invention, the reactor tubes are supplied separately from one another via pressure reduction units. As a result, its own flow of starting material can be determined for each tube, which is adapted with respect to other reactor tubes, i.e. is selected to be substantially the same. "Substantially" should be understood such that slight deviations in the range of less than 5% of the flow, in particular less than 3%, especially less than 2% or less than 1%, most preferably less than 0.5% can be possible. Depending on the starting material which can lead to different by-products and solid deposits, the maximum difference in the flow of the individual reactor tubes should be kept low. Without individual pressure resistance or flow control, tubes in the centre of a bundle, for example, having a circular cross-section tend towards intensified flow and tubes at the end of the bundle tend towards weaker flow (at least in the case of a centrally positioned common feed through a supply line or lead-in). According to the invention, this disadvantage can be avoided whereby a uniform distribution of the starting material to all tubes of the reactor is rendered possible. In addition to the reactor tubes which are provided for the pyrolysis or thermolysis, the reactor can have additional tubes which are not subject to this flow control.

The uniform flow can be rendered possible by variously selected pressure reduction units. Such pressure reduction units are, for example, pressure regulators or capillaries having a predetermined pressure resistance. As a result of different capillary diameters and/or lengths, these have a different pressure resistance. As a result flows of all the tubes can be matched. For example, in the case of concentrically arranged tubes, for tubes at the centre of the bundle the pressure reduction unit is selected with a higher pressure resistance, compared to tubes at the edge of the bundle, than tubes which would normally have had a lower flow with a common feed. Therefore tubes having usually high flow have reduced loading due to a higher pressure resistance (e.g. a longer or narrower capillary) than without individual pressure reduction and tubes having otherwise low flow are more intensively loaded as a result of a lower pressure resistance compared to the tubes at the centre (e.g. due to shorter or wider capillaries). Thus in one example it is possible to use a supply line which opens into a distributor region from which the individual pressure reduction units lead to the individual reactor tubes. Alternatively it is also possible to select an individual supply line (with inherently the same flows) for each tube with the same pressure regulation units for all the tubes in order to ensure the same flow. One possibility, for example, is a distributor cap with supply hoses having the same dimensions for each reactor tube.

In addition to identical control of the flow, the pressure reduction units can be used to enable a precise control of the flow. For this purpose the pressure resistance of the pressure reduction units is selected so that no flow is possible when not operating. That is, the pressure resistance is equal to or greater than the pressure difference of the supply line to the interior of the reactor tubes. Usually the starting material is supplied through the supply line via a pump which produces a predetermined positive pressure, the negative pressure in the interior is usually produced by a negative pressure or vacuum pump, which is downstream of the reactor. This negative pressure can also be freely selected, "Negative pressure" should be understood relatively herein. The negative pressure in the interior of the reactor tubes is relative to the pressure of the supply line. The negative pressure can, but need not, be an absolute negative pressure, i.e. a negative pressure relative to atmospheric pressure. It is, for example, also possible to maintain absolute positive pressures in the interior, either by the inflow of medium through the supply line or alternatively or in combination through a separate supply of a medium, preferably an inert medium or air, into the interior of the reactor tubes. During the thermolysis of formamide, for example, an absolute negative pressure below 1000 hPa is selected. The pressure resistance of the pressure reduction units in preferred embodiments is at least 800 hPa, preferably at least 900 hPa, or at least 1000 hPa, at least 1100 hPa, at least 1200 hPa, at least 1300 hPa, at least 1400 hPa, at least 1500 hPa, at least 1600 hPa, at least 1800 hPa, at least 2000 hPa. Preferably the pressure resistance at atmospheric pressure inside the reactor tubes prevents the inflow of starting material.

In preferred embodiments, the negative pressure inside the reactor tubes is selected in such a manner that the inflow of fluid into the reactor is between $1 \times 10^{-5}$ m$^3$/h and 1 m$^3$/h, preferably between $1 \times 10^{-4}$ m$^3$/h and $1 \times 10^{-1}$ m$^3$/h, and/or between 0 and $1 \times 10^{-6}$ m$^3$/h, preferably between 0 and $1 \times 10^{-8}$ m$^3$/h, when not operating. In preferred embodiments the negative pressure inside the reactor is selected in such a manner that the inflow of fluid into the reactor is between $1 \times 10^{-2}$ kg/h and 1000 kg/h, preferably between 0.1 kg/h and 100 kg/h and/or between 0 and $1 \times 10^{-3}$ kg/h, preferably between 0 and $1 \times 10^{-5}$ kg/h when not operating. When not operating, the pressure inside the reactor tubes is usually atmospheric pressure, of about 1000 hPa.

The negative pressure thermolysis or pyrolysis is preferably operated at pressures below atmospheric pressure. In particular embodiment, the pyrolysis or thermolysis of the starting material is carried out at absolute negative pressure, preferably at an absolute pressure of up to 500 hPa, particularly preferably of up to 250 hPa, especially preferably in the range of 80 hPa to 200 hPa.

An essential advantage of the present invention lies in the controlled pressure feed. In a negative pressure reactor there is the risk that without precise control of the feed pressure, the negative pressure breaks through into the supply line or this breakthrough only appears in a few tubes—i.e. only the central tubes would be sufficiently loaded. This is eliminated by the pressure and inflow control according to the invention and specifically by the individual pressure resistance/loss of the tubes and the associated same type of pressure build-up before the introduction into the reactor tubes or the maintained internal pressure in the reactor tubes.

For the pyrolysis or thermolysis the reactor is heated. For this purpose, preferably the inner surface of the reactor tubes is heated to the decomposition temperature of the starting material. The effective surface area can preferably be increased by appropriate inserts in the reactor tubes, such as for example, packings or the incorporation of specific bodies. Preferably incorporated bodies have, for example, an additional mixing function, e.g. such as a static mixer. Preferably screens, sinter elements or star-shaped bodies are used which in particular can be incorporated offset into the tubes so that a star spur region lies above a gap region. Such an insertion element, in particular a sinter element is preferably placed in the evaporator in the vicinity of the supply or the pressure reduction unit in order to ensure an optimal distribution in the evaporator and complete evaporation.

The reactor tubes need not be heated over the entire length to the decomposition temperature. Heating in a (primary) section is sufficient.

Other sections can be provided for pre-heating or evaporation, in which for example the starting material is heated at least to boiling point but below the decomposition temperature. Preferably in the method according to the invention the starting material is pre-heated and evaporated at a temperature below the decomposition temperature. The device according to the invention can comprise an evaporator. Preferably the evaporator is mounted directly upstream of the decomposition section, i.e. the pressure reduction units described above lead firstly into the evaporator (or evaporation section) and subsequently into the thermolyzer (or thermolysis section or decomposition section). The starting material is therefore evaporated in a secondary (pre-heater) section of the reactor tubes and preferably supplied from the secondary section into the primary (thermolysis) section. Preferably the starting material is introduced into the evaporator via an injection nozzle to promote atomization and good distribution. The starting material can be dissolved in a solvent, which is optionally also evaporated in the evaporator section.

Thermolysis is a chemical reaction in which a starting material is decomposed by controlled heating into one, two or more products. Whereas thermolysis is therefore concerned with the presentation of certain products (or reactive intermediate stages), pyrolysis relates to the thermal decomposition with the aim of breaking down these substances. The reactor according to the invention is suitable for both reactions and is designated uniformly for both processes as "thermolyzator" without being restricted to thermolysis. Likewise thermolysis can be an intermediate step in the reactions of the reactor. Further (consecutive) reactions are possible. In particular, the term thermolysis as used herein relates to the chemical reaction of the starting material under the action of heat without any cleaving being made. Such possible reactions are, for example, chemical rearrangements such as Beckmann rearrangement which can be used, for example, to form epsilon caprolactam. Other possible reactions for the reactor according to the invention are catalytic conversions, in particular acid-catalysed conversions or surface reactions, isomerizations, hydrolyses, etc., chemical reactions which take place under the action of heat with heat supplied from outside.

Preferably the inner heated surface defines the substantially entire interior of a pyrolysis or thermolysis reactor (all heated reactor tubes). "Substantially" is used here since clearly some regions must remain free such as, for example, supply or discharge openings for the infeed or outfeed opening of the starting or decomposition product. Preferably at least 70% of the surface of the interior is heated, particularly preferably at least 75%, at least 80%, at least 85%, at least 90%, or at least 95%.

The inner surface of the reactor tubes is preferably heated to evaporation temperature. In the secondary section, heating takes place to a temperature below the decomposition temperature, preferably at least 20° C., particularly preferably at least 50° C. below the decomposition temperature and/or to a temperature at which no solid by-products of the evaporation of the starting material are formed, in particular no polymerization products are formed.

From the heatable evaporator, preferably at least one gas line (or several, e.g. for each reactor tube) leads into the reactor. The evaporator can also be a section in the tube bundle reactor.

The method according to the invention or the device is designed for continuous operation. Preferably the decomposition is operated continuously in the primary section, preferably also the pre-heating and evaporation, and the transfer of the starting material to the primary section. The evaporator can be used for fluidization of the starting material and/or transfers this into the gaseous state.

The heating of the reactor according to the invention and the reactor tubes preferably takes place indirectly, in particular inductively. An alternative direct heating is preferably from outside the interior of the reaction tubes. Naturally combinations of an indirect or direct heating can also be provided. Especially the inner surface of the reactor tubes is inductively heated in the primary section. Likewise the inner surface of the reactor tubes can be inductively heated in the secondary section. For the inductive heating the reactor tubes are at least partially made from an electrical conductor for heating by induction. In particular, the parts around the heated surfaces should be heated. Both the inner surfaces of the tubes and/or the incorporations can be inductively heated. As a result, the heat required for the pyrolysis or thermolysis is produced immediately at the required site. Inductive heating has the advantage that directly at the site of the pyrolysis—at which the deposits are formed, these can easily be burned off or removed by increasing the temperature, with or without supplying oxygen.

For the induction, conductor tracks can be laid around the reactor, the tube bundle and/or around the individual tubes. Various forms are known for this and described for example in Zinn and Semiatin (Heat Treating June 1988: 32-36) or Zinn and Semiatin (Heat Treating August 1988: 29-32) which are included herein by reference. The conductor tracks generate a magnetic field which produces heat in the reactor tube by polarity reversal and magnetization losses, e.g. eddy current losses. The current can be produced by an operating connected high-frequency generator. A usual frequency range is about 5 kHz to 2.5 MHz, preferably 250 kHz to 1 MHz. The power can be in the range of 2 kW to 600 kW, preferably 30 kW to 200 kW, or higher depending on the reactor size. Preferably the conductor tracks are cooled for the induction, e.g. water-cooled. For effective induction the surface of the reactor tubes is made of a magnetic or magnetisable material having the highest possible Curie temperature so that effective heating up to the decomposition temperature or higher is rendered possible. The Curie temperature of pure metals is, for example: cobalt: 1121° C., iron 766° C., nickel 360° C. By means of induction however, a higher heating is possible merely as a result of the conductor properties (eddy current losses). Preferably the surface or the reaction tubes are made of iron or an iron alloy, preferably steel.

The invention relates to a method for the pyrolysis or thermolysis of a fluid or fluidized starting material characterized in that the starting material is pre-heated and evaporated at a secondary heated surface, the evaporated starting material is transferred to a primary heated surface where this primary heated surface is an inductively heated surface and at the primary heated surface is heated to a decomposition temperature of the starting material, whereby the starting material is pyrolyzed or thermolyzed and a pyrolysis or thermolysis product is obtained. The reactor is preferably a tube bundle reactor.

During the pyrolysis or thermolysis of various starting materials, e.g. formamide, solid deposits can be formed due to side reactions. Preferably solid deposits which are formed by pyrolysis or thermolysis optionally as by-products, are removed by elevated temperature of the inner surface of the primary section, in particular for evaporation, decomposition or for burning-off the deposits. For removal the inflow of the starting material is stopped and the reactor is heated to an elevated temperature to remove the deposits. For this purpose the temperature can, for example be raised to at least 1200° C. or at least 1400° C. in the primary section.

For some pyrolyses or thermolyses the presence of a catalyst is advantageous. Thus, the surface (of the tube inner wall and/or the incorporation bodies) in the primary section can be coated with a catalyst. An iron catalyst, for example, is expedient for the thermolysis of formamide. The surface can, for example comprise iron or iron oxide. Preferably the inner surface of the reactor tubes at least in the primary section is the surface of an iron body.

The device or the reactor interior should be heatable at least to 500° C., preferably to at least 750° C. or at least 1000° C., particularly preferably at least 1300° C., particularly preferably the reactor tubes comprise iron bodies and/or an iron-containing surface. A heating element such as, for example, an induction coil or an electrical heating element can be attached for this purpose.

Especially the starting material is a carboxylic acid amide, e.g. formamide or glycerin. Thus, a special method, also within the framework of the embodiments described above, is described for the thermolysis of a carboxylic acid amide, preferably formamide, to form HCN or for the dehydration of glycerin to form acrolein. The thermolysis takes place in a tube bundle reactor with a plurality of reactor tubes; in a first series of process steps, the starting material, in particular formamide or glycerin, is brought in contact with a heated surface of the reactor, wherein the plurality of reactor tubes of the tube bundle reactor are loaded with equal quantities of starting material by pressure regulation, wherein on the heated surfaces the starting material is heated to its decomposition temperature and product e.g. HCN-gas or acrolein, is continuously removed.

Preferably oxygen, e.g. in the form of air, is introduced into the reactor before the primary section, which reduces the production of by-products. This introduction is preferably after the secondary section (evaporator).

In a second series of process steps, without introducing starting material into the reactor the temperature is increased above the decomposition temperature in order to remove possibly formed solid deposits of by-products of the product formation by evaporation, decomposition or burning off.

Preferably for the thermolysis of formamide the surface is heated to 430° C. to 600° C., or for the thermolysis of glycerin to 300° C. to 500° C., preferably inductively.

For removal of by-products the surface is preferably heated to 700° C. to 1500° C., preferably inductively.

After the thermolysis or pyrolysis, the product is separated from the gas stream. The product can be further purified and refined. Preferably the product is passed via a heat exchanger for recovery of heat. The heat obtained can be used for pre-heating the starting material or in a downstream refining step.

BRIEF DESCRIPTION OF THE DRAWINGS

The present invention is explained in detail by the following figures and examples without being restricted to these embodiments of the invention.

DETAILED DESCRIPTION

Figure 1:
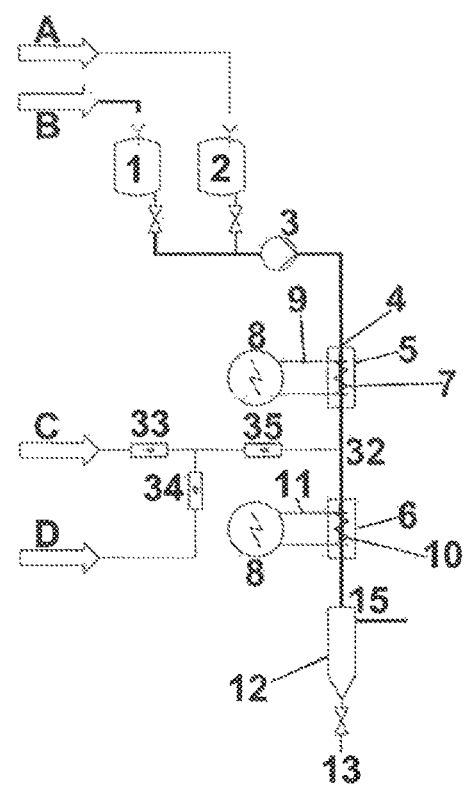
FIG. 1 shows a schematic structure of a device for the thermolysis of a starting material. The substances A (e.g. starting material) and B (e.g. a second starting material or a carrier medium such as water) to be evaporated are placed in the corresponding storage containers (1 and 2). The substances A and B can be supplied via a conveying device mounted thereafter simultaneously or successively or in a mixture to the conveying device (3). The starting materials are introduced via a pressure reduction unit (4) into an evaporator (5) for evaporation of the starting materials. The evaporator (5) is heated via an induction coil (7) which is connected via an electrical lead (9) to an alternating voltage generator (8). The gaseous (evaporated) substances are fed into the thermolyzer (6) which is heated inductively by means of a coil (10). For this purpose the alternating voltage is obtained from a generator (8) via lead (11). Between evaporator (5) and thermolyzer (6) further substances, in particular gases (C, e.g. air and D, e.g. inert gas, $N_2$) can be introduced via valves (33, 34 and 35) at position 32. Pyrolysis products are led off via a cracked gas discharge line (14) and a condensate separator (12). Condensate can be led off via a valve (13).

With reference to FIG. 1, the starting materials (A and B) to be evaporated according to the invention, of which at least one is to be thermolyzed or pyrolyzed, are placed in corresponding storage containers (1 and 2). The storage containers can be equipped with heating or cooling and can be superposed with a flushing gas if necessary. The storage containers can also be equipped with an agitator or corresponding circulating devices for precipitating starting materials. The starting materials (A and B) can be supplied via a conveying device mounted thereafter to the conveying device (3) simultaneously or successively or in a certain mixing ratio. The process can be expanded by supplying an arbitrary number of starting materials according to chemical requirement.

Geared pumps, piston metering pumps, centrifugal pumps, membrane pumps or similar can be used as the conveying device. After the conveying device, before entering into the evaporator, the fluid stream passes through a pressure reduction unit (4) adapted to the process pressure so that the corresponding process pressure and the fluid inflow can be adjusted in the evaporator part (5) and in the thermolyzer part (6). In the evaporator preferably insertion elements for thorough mixing, in particular a sinter element or screen, is placed in the evaporator in the vicinity of the supply or the pressure reduction unit in order to ensure an optimal distribution in the evaporator and complete evaporation. Likewise, immediately after the injection into the evaporator, the feed stream can be finely distributed in the evaporator part by means of a porous plate introduced in the evaporator head part. The distribution of the liquid in the evaporator part can be configured so that a distributor plate (preferably porous) is inserted in the entire evaporator part or over its length and guides the liquid in a spiral manner to the evaporator inner wall. For more efficient evaporation the heat input into the fluid to be evaporated can be optimized, e.g. by means of a surface area enlargement, e.g. by inserts, which are preferably also heated inductively, also in the interior heat can be input via the inserts. The surface area can thus be increased by up to 100 times compared with the surface area of the empty tube.

The inflow is controlled by means of a pressure reduction unit, in particular via a supplying capillary, e.g. by means of the dimension of the capillary, so that due to the pressure loss of the pressure reduction unit the vacuum applied with the negative pressure pump is adjusted and maintained in the evaporator and thermolyzer part, where the evaporator is continuously supplied with liquid.

The evaporator body (5) can be round, angular or designed in a particular geometrical shape adapted to the evaporation process. The evaporator body (5) is surrounded by an induction coil (7) for heating to operating or evaporation temperature. The induction coil (7) can be mounted loosely around the evaporator body or can be embedded in a refractory cement for shielding the temperature and as a safety precaution. The induction coil (7) can be configured to be helical, fork-shaped, rod-shaped, zig-zag-shaped and completely or only partially surround the evaporator body. The induction coil (7) is connected via connecting pieces or a connecting line (9) to an induction generator (8).

Constructions and design of induction coils are described by Stanley Zinn and S. L. Semiatin in Heating Treating June 1988 on pages 32-36; Coil design and fabrication: basic Design and modifications as well as in Heating Treating August 1988 on pages 29-32; Coil design and fabrication: part 2, specialty coils and in Heating Treating October 1988 on pages 39-41; Coil design and fabrication: basic Design and modifications part 3, fabrication principles. The induction coils can be embedded in a heat-resistant cement mould or other heat-resistant insulating material for insulation.

For the inductive heating of the evaporator part (5) the evaporator can be made of an electrically conductive material such as metal or a semiconductor material (silicon) or at least partially contain this. The high-frequency energy produced via the induction generator (8) is transferred via an inductor (induction coil) (7) to the evaporator. The inductor (7) can be adapted to the geometrical shape of the heating zone and usually bent from a copper hollow profile, shaped and water-cooled for intrinsic protection prior to heating. Inductive medium- and high-frequency generators having a power of up to 600 kW and a frequency of 5 kHz to 2.5 MHz can be used as inductive generators (8). Usual frequencies to be set for operation are in the range between 5 and 150 kHz. The frequency of the induction generator was pre-selected by means of a potentiometer or pre-selected and fixed for the evaporation and thermolysis process. A memory-programmable control can also be used for continuous evaporation and thermolysis. If the process should allow this, a capacitive heating of the reactor system can also be used. Powers up to 200 kW at a frequency of 13 to 30 MHz can be used.

For self-protection (securing against heating and melting), the induction coils usually consisting of copper/copper alloys can be cooled with cooling water in the interior of the induction coil where according to power, a cooling water flow can be adjusted between 180 l/h and 30 m$^3$/h and preferably guided via the frequency controller.

The heating power [W] induced in the reactor can be adjusted via the current in the induction coil [Ampere], the relative permeability of the evaporator and thermolysis tube material, the specific resistance of the evaporator and thermolysis tube material [R×mm=/m] and the set frequency [Hz]. Typical specific resistances of aluminium $2.65 \cdot 10^{-2}$; stainless steels $7.2 \cdot 10^{-1}$; iron $1.0 \cdot 10^{-1}$ to $1.5 \cdot 10^{-1}$; precious metals $2.214 \cdot 10^{-2}$ can be expected.

For calculation of the heating power the following materials have a relative permeability [µr] copper $1-6.4 \cdot 10^{-6}$; aluminium $1+2.2 \cdot 10^{-5}$; platinum $1+2.57 \cdot 10^{-4}$; iron 300 . . . 10,000; ferrite 4 . . . 15,000; NiFe 50,000 . . . 140,000.

The design of the evaporator and thermolysis tubes as well as their dimensions and tube mass can be selected so that the energy input to be introduced via the evaporator and thermolysis tubes or power for the control of the evaporation and cracking process can be accomplished in a short time. Depending on the throughput requirements and tube mass used, the evaporation and thermolysis process can be operated with a specific energy input between 12 Watt·s and 60,0000 Watt·s, preferably between 5,000 Watt·s and 30,000 Watt·s so that depending on the required evaporation power and cracking power which can be calculated from the material data, a relatively short heating of the evaporation and thermolysis system results. The set process pressure inside the reactor usually varies between 50 and 200 mbar and can be set or kept constant with a negative pressure pump and/or a control valve.

The heat is produced in the evaporator part (5) or in the following thermolyzer (6) in the reactor tubes themselves and no heat transfer medium is required (e.g. air or other conducting solid compounds). The electrical energy is transferred to the reactor to be heated in the case according to the invention to the evaporator body (5) or thermolysis body (6) by a magnetic field.

The alternating current flowing through the induction coil/inductor (7) produces a magnetic alternating field which results in a specific current in the workpiece. The electrical energy supplied via the induction coil (7) is therefore first converted into magnetic energy and this is then converted into heat in the workpiece. The current density in the workpiece is determined by the so-called "skin effect". In this case the highest current density is achieved at the evaporator or thermolyzer surface. Experience shows that the current density decreases exponentially inwards. Almost no current flows in the interior of the induced material. The higher the frequency of the voltage applied to the inductor (7), the smaller is the penetration depth of the eddy currents in the evaporation and thermolysis apparatus (skin effect).

Specially shaped insertion elements can be incorporated in the evaporator and thermolysis body to enlarge the surface area. These insertion elements can be introduced over the entire length of the evaporator and thermolysis body as "single-rod bodies" or in individual shaped body segments where the segments can be radially offset with respect to one another so that a deflection during evaporation of the liquid stream or during thermolysis of the vapour and the cracked gas can be deflected and brought in contact with the heating surface. The contact surface can at the same time be formed as a catalyst contact surface. Preferably the insertion elements are inductively heated.

Figure 2:
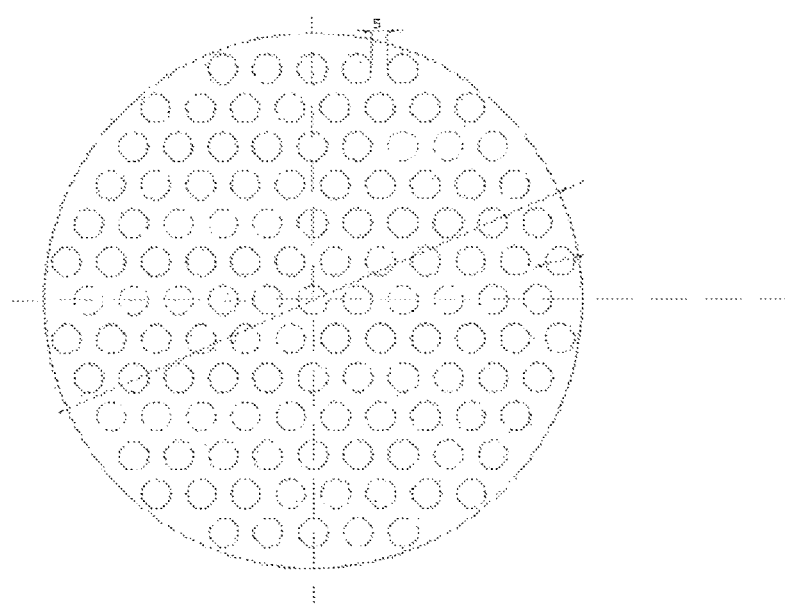
FIG. 2 shows a cross-section through a reactor with a tube bundle of 120 individual tubes (tube reactors).
Figure 3:
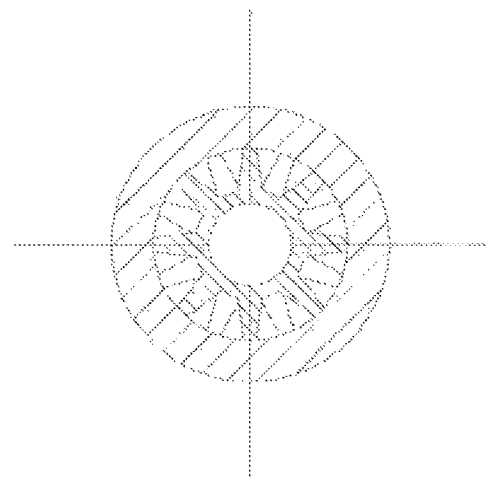
FIG. 3 shows a cross-section through a tube with two offset star-shaped incorporations stacked one above the other.
Figure 4:
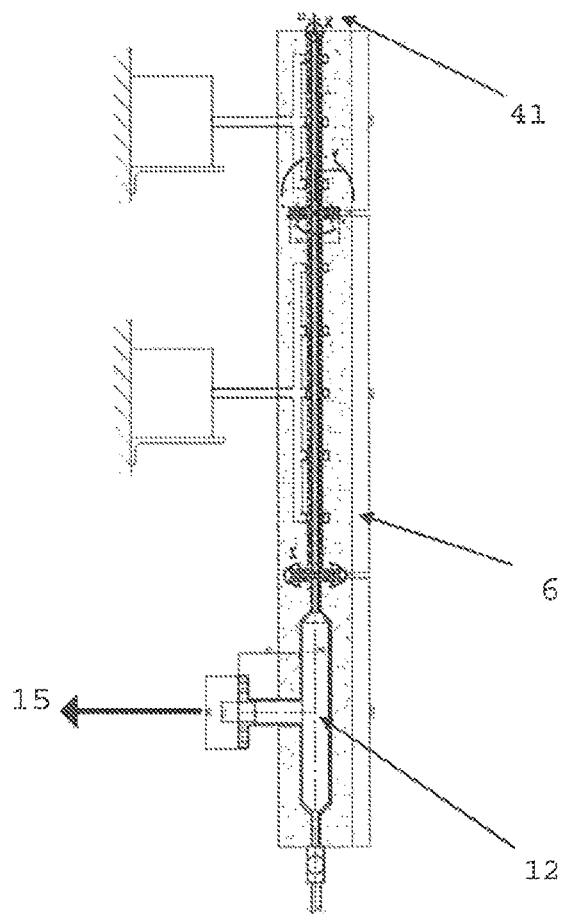
FIG. 4 shows a schematic structure of a thermolysis reactor in an insulated housing. The starting material supply line leads to point 41 at which the starting material is introduced into the evaporator section. The evaporator is connected to an HF generator to produce the induction field for the inductive heating. The evaporator section is connected to the thermolyzer section (6) via a flange, which has its own operatively connected high-frequency (HF) generator, to produce the inductive heating to the decomposition temperature. The thermolysis product is collected via a withdrawal zone (12), here possibly connected to a heat exchanger to recover heat, and fed for further processing and purification via the discharge line (15).

In order to configure an economical thermolysis process, a tube bundle apparatus can be heated in an induction field. Due to the tube bundle geometry, cavities and empty areas are located between the individual tubes so that a severely reduced induction heating must be expected. Surprisingly it has been found that according to FIG. 2, tube bundles can be configured as evaporator and pyrolyzator/thermolyzator which can be heated very efficiently in the induction field where the tube spacing between the individual process evaporators and thermolyzator tubes was selected constructively so that a minimum spacing of 2 mm, preferably 5 mm was given. Preferably thin-walled tubes were used for the evaporator body (7) and the thermolyzator (6). The tube wall is for example between 0.1 mm and 2 cm, preferably between 1 mm and 1 cm. It is also possible to have an evaporator reactor section and/or a thermolysis reactor section each having up to 500 individual tubes. The number of tubes between evaporator body and thermolysis body can however also be selected differently.

The evaporator and thermolyzator tubes can be assembled into a bundle according to a predefined pitch and welded or pressed onto the respective tube bundle elements with the head/end plate. A plurality of intermediate plates can be inserted between the head/end plate. This has proved advantageous since, due to the inductive heating, temperature zones with different temperature zones compared with the tube bundle temperature can be established in the plate regions so that the reaction control or temperature control can be specifically influenced. The head/end plates or the intermediate plates can be offset as round holes, in a straight row as round holes, in a straight row as square holes, offset as square holes, diagonal as square holes, offset as hexagonal holes and however offset as long holes and running transversely in a straight row as long holes and running transversely in an angular manner in a straight row as long holes.

The evaporator part (5) is connected positively and tightly to the thermolyzator part (6). Screws, flanges or also compression sleeves can be used as connecting elements. Joining together with thermally resistant, processable ceramic (ceramic adhesives Durabond®) is also possible. The seal between thermolyzator (6) and evaporator body (7) can be made by means of metal seals or by means of ceramic seals or by means of threaded seals themselves.

The thermolysis body (6) can be designed to be round, angular or in a special geometrical shape adapted to the thermolysis process. The thermolysis body (6) is surrounded by an induction coil (10) for heating and cracking the starting material supplied in liquid or vapour form at operating or cracking temperature. The induction coil (10) can be mounted loosely around the thermolysis body or can be embedded in a refractory cement for shielding the temperature and as a safety precaution. The induction coil (10) can be configured to be helical, fork-shaped, rod-shaped, zig-zag-shaped and completely or only partially surround the evaporator body. The induction coil (10) is connected via connecting pieces or a connecting line (11) to an induction generator (8). At the exit from the thermolysis body (6), a process condensate removal system (12) is provided to be able to specifically collect any condensate (13) which may accumulate when starting the thermolysis.

Since thermolysis processes take place at very high temperatures and when re-using the cracked gas, the downstream apparatus and process installation parts can be operated at lower temperatures, the cracked gas can be supplied via a cracked gas channel (15) (heated or unheated) and/or a heat exchanger for cooling and/or heat recovery.

Shaped bodies, tubes and incorporations or inserts can be made of catalyst material such as $\alpha$-iron/$Al_2O_3$; iron alloys, catalyst material of $CuO/Cr_2O_3$, $ZnO/Cr_2O_3$ or $CuO/ZnO$, $V_2O_5$/carrier as well as catalysts of platinum/rhodium and can be used for the evaporation and thermolysis.

An advantage of the inductively operated evaporation and thermolysis process is that if deposits or clumps should form in the interior in the course of operation of the installation, these can be removed by heating. A flushing with liquids can thereby be omitted and prevents hazardous process chemicals from accumulating. The good temperature controllability and the good start-up and shut-down behaviour of the reactor according to the invention allows hazardous substances such as, for example, the manufacture of hydrocyanic acid from formamide to be produced on site or at the place of use "on-demand" and these need not be subjected to hazardous substance transport and the conditions thereof.

Figure 5A:
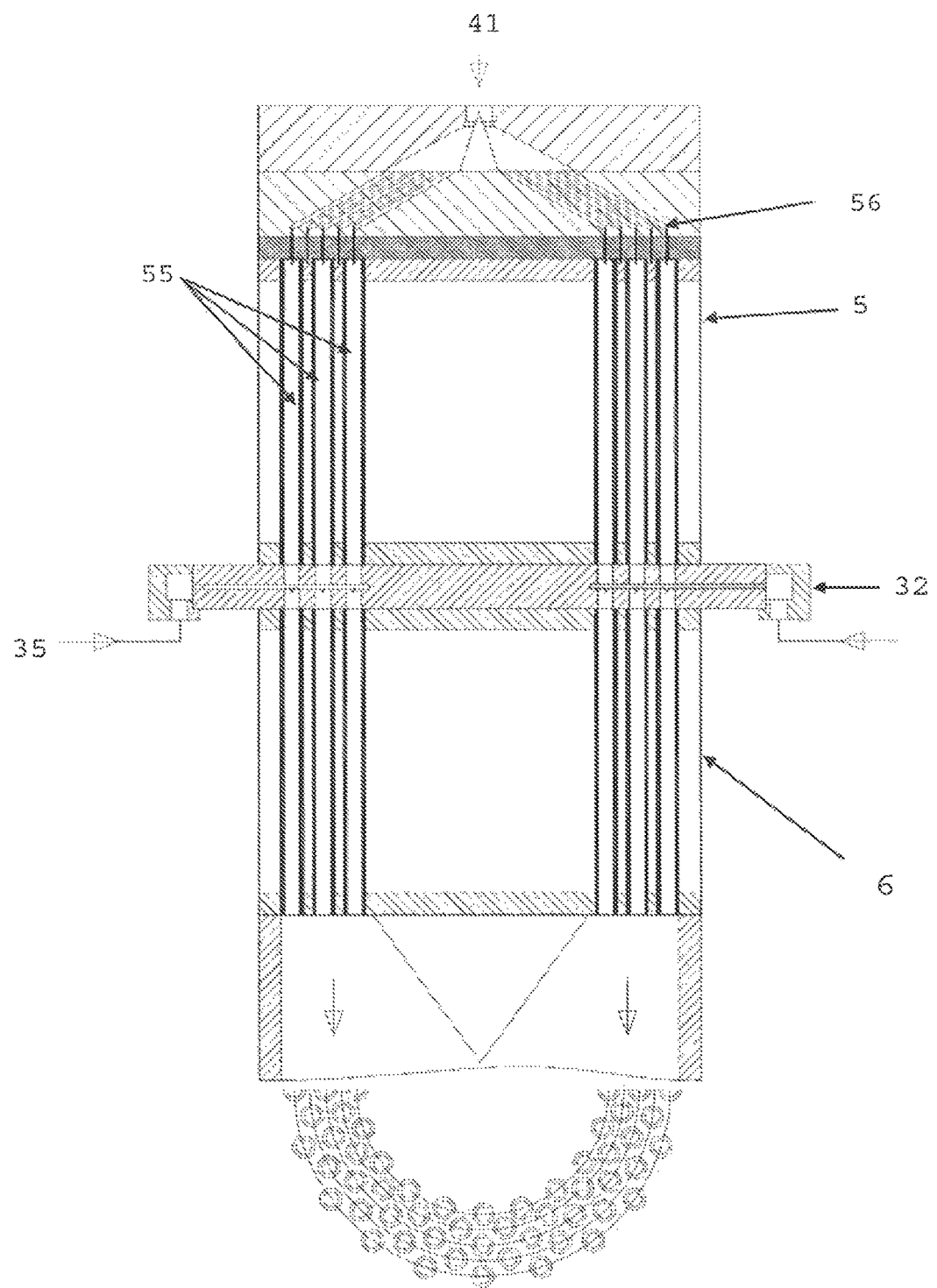
FIG. 5 (with the subfigures 5A-5C) shows a device comprising an evaporator (5) and a thermolyzer (6) (FIG. 5A) which are connected via a central flange (32, enlarged in FIG. 5C). In the flange a line (35) is provided for blowing in a gas (e.g. air). A line (41, enlarged in FIG. 5B) leads into the evaporator, which branches for the individual tubes (55) of the bundle and opens in pressure reduction units in the form of capillaries (56). In this embodiment of the individual supply of the tubes, the pressure reduction units of the individual tubes are designed to be of the same type. A cross-section of the tube bundle is given in the lower area of the figure.
Figure 5B:
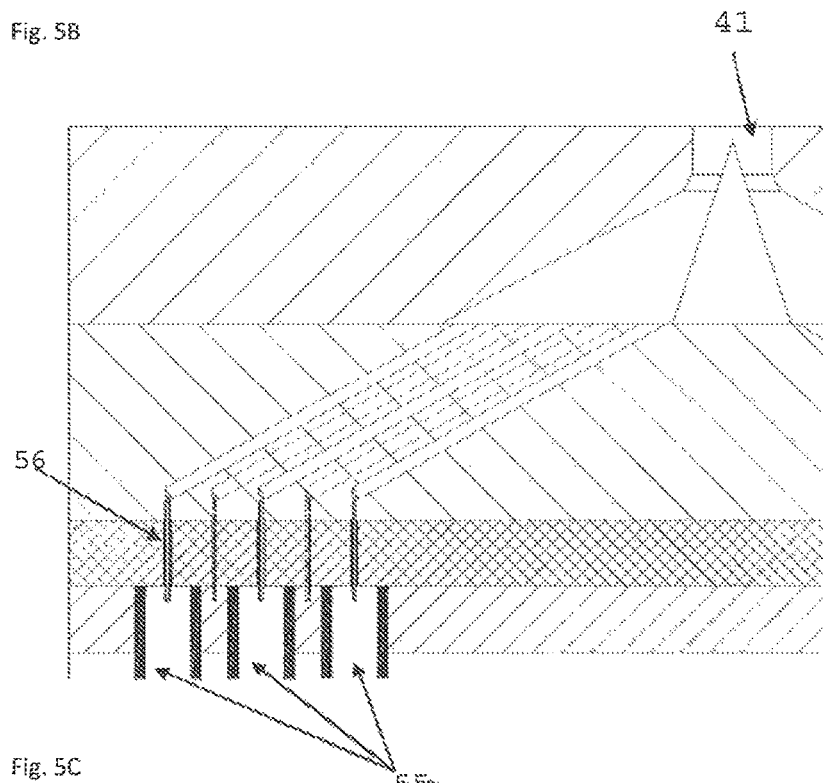
Figure 5C:
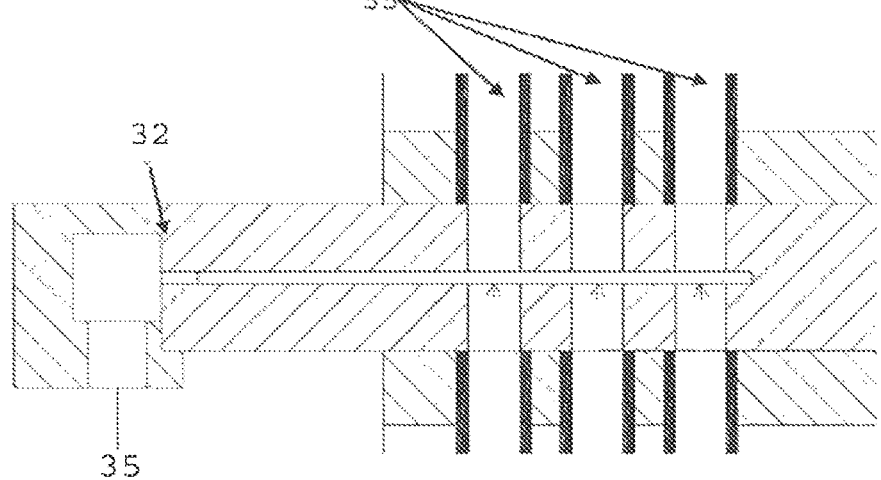
Figure 6A:
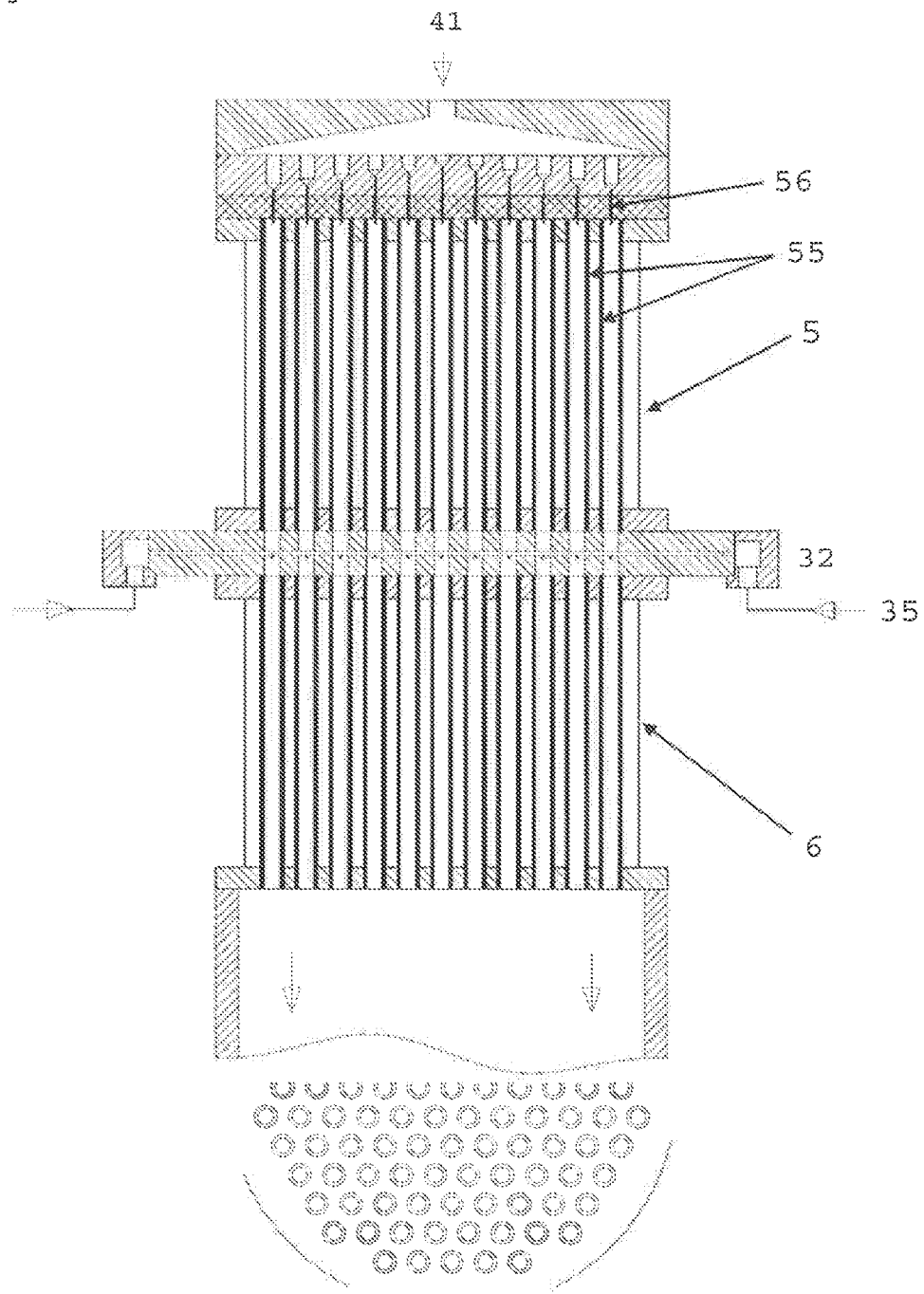
FIG. 6 (with subfigures 6A, 6B) shows a device comprising an evaporator (5) and a thermolyzer (6) (FIG. 6A) which are connected via a central flange (32). A line (41, enlarged in FIG. 6B) leads into the evaporator which opens in a cap region with individual pressure reduction units in the form of capillaries (56) in different design for the individual tubes (55) of the bundle. A cross-section of the tube bundle is given in the lower region of the figure.
Figure 6B:
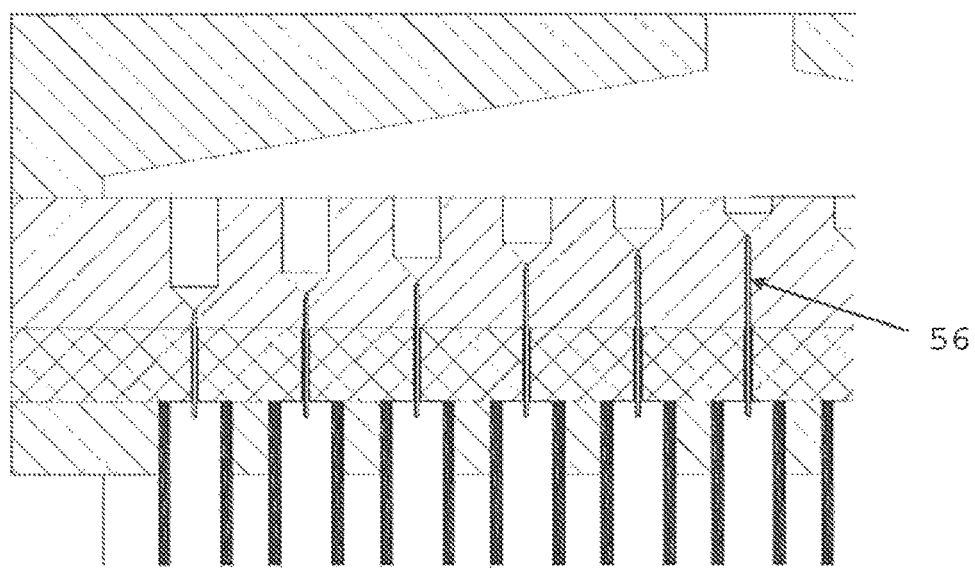
Figure 7:
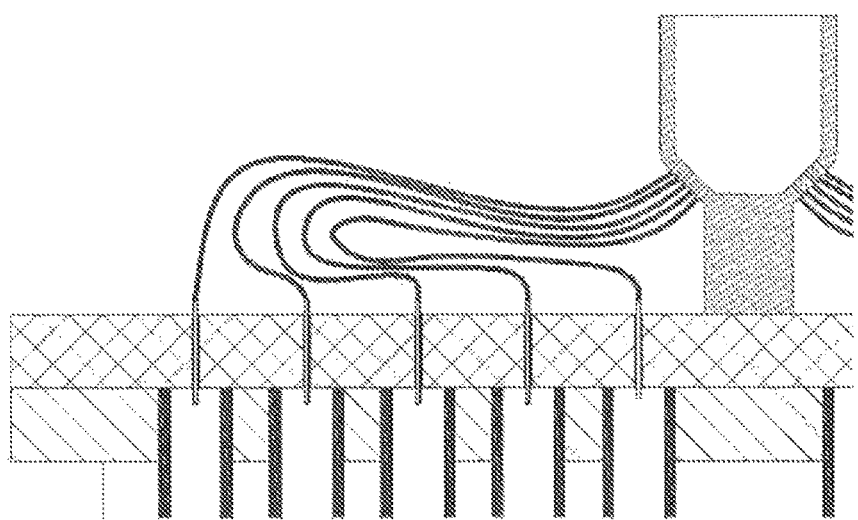
FIG. 7 shows the end of a supply line for the reactor with individual connecting hoses for the introduction of the starting material via capillaries into the reactor tubes.
Figure 8A:
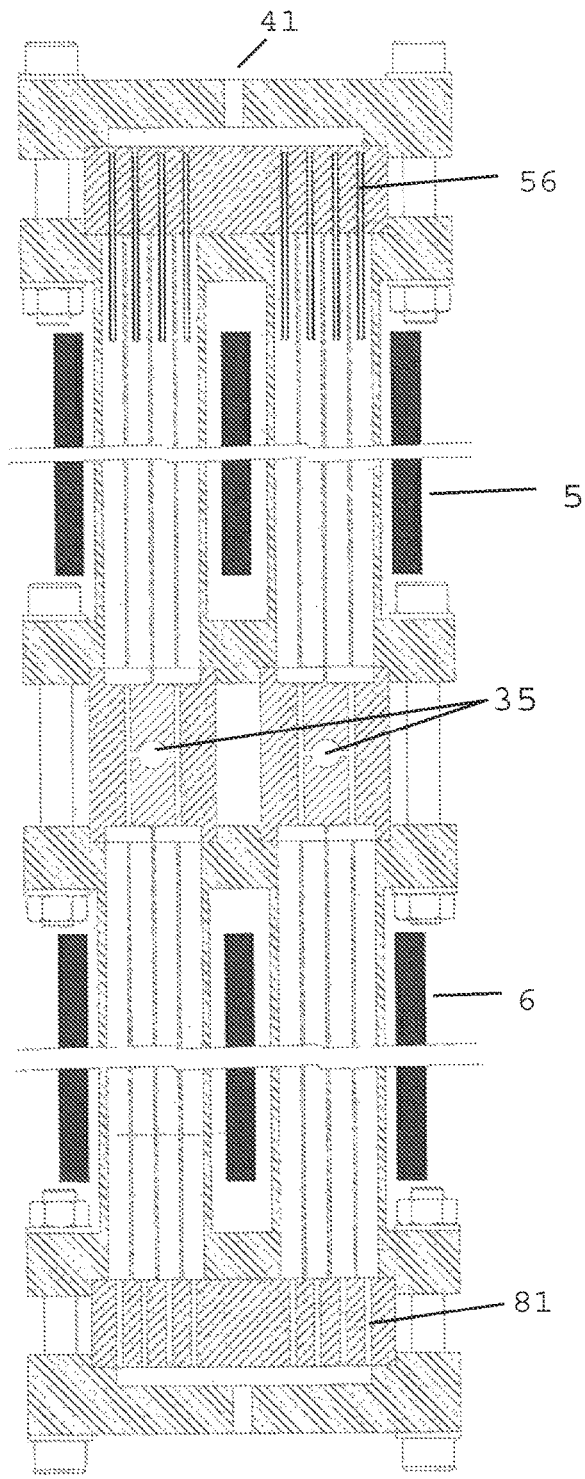
FIG. 8 shows a rectangular reactor with a rectangular arrangement of the tubes (see cross-section FIG. 8B, cross-section through evaporator (5) and thermolyzer (6)). Shown in cross-section through the plan view (FIG. 8A) is the supply line (41) which leads to a distribution to the capillaries (56); from there the starting mixture is passed into the evaporator (5) via an intermediate element with the supply lines (35) into the thermolyzer (6). Unheated collecting tubes (81) are provided at the end of the thermolyzer. This design dispenses with central reaction tubes (e.g. opposite the inlet of the supply line (41) in order to avoid no tubes with stronger or non-uniform loading.
Figure 8B:
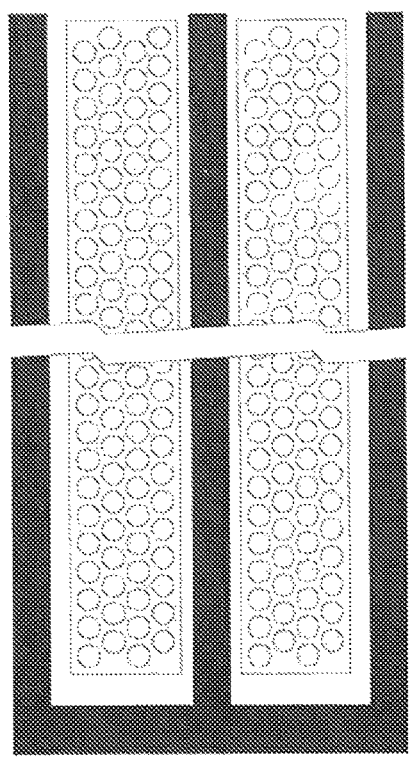

The supply of process fluid and/or process gas (fresh gas or recycled gas) can take place according to FIG. 1 at location (32) where the supply can be designed as described in FIG. 5 or 6 in the connecting section between evaporator and thermolyzator.

EXAMPLES

The experiments were carried out using a reactor system as described above (example description according to FIG. 1).

The reactor system was composed of 120 tubes for the evaporation part and the same number of tubes for the thermolysis part. ST35 precision tube components according to DIN 2391 were used for the tubular evaporator and thermolysis components used. The inside diameter varied between 0.5 and 13 mm where the tube wall thicknesses used varied between 0.1 and 1.5 mm. The thermolysis part was connected directly to the evaporator part.

The evaporator and thermolyzator tubes were assembled to form a bundle according to a predefined pitch and welded or pressed onto the respective tube bundle ends with the head/end plate. A plurality of intermediate plates are inserted between the head/end plate.

Both reactor sections were fitted into an induction coil specially adapted to the evaporator body and the thermolysis body for inductive heating.

The induction coil was connected to a generator having a power of 15-20 kW. Frequencies in the range between 5 and 150 kHz were used for the induction heating. For self-protection (securing against heating and melting) the induction coils consisting of copper/copper alloys were cooled with cooling water in the interior of the induction coil. The control of the induction coil and therefore the supplied energy as well as maintaining the precise process temperature (+/−1° C.) was performed using a pyrometer.

The design of the evaporator and thermolysis tubes as well as their dimensions and tube mass were selected so that the energy input or power to be input via the evaporator and thermolysis tubes for control of the evaporation and cracking process can be accomplished in a short time.

The process pressure set in the experiment varied between 50 and 200 mbar and was adjusted or kept constant with the negative pressure pump and a valve.

Tubes having a diameter of 7 mm and a length of 25 cm were used for Experiments 1 to 9, tubes having a diameter of 1 mm and a length of 30 cm were used for Experiment 10, tubes having a diameter of 0.5 mm and a length of 30 cm were used for Experiment 11. As a result different surface and volume loadings in the reactor were obtained for different inflow. In all cases, the temperature (cracking gas temperature) required for the catalytic pyrolysis of starting materials which decompose at −500° C. such as carboxylic acid amide, in particular formamide, could be achieved.

The invention claimed is:

1. A method for the pyrolysis or thermolysis of a fluid or fluidized starting material in a tube bundle reactor including a plurality of heatable reactor tubes, the method comprising: feeding the starting material to the tube bundle reactor at one end by at least one supply line, wherein the supply line has several pressure reduction units which enable a positive pressure before the starting material is introduced into individual reactor tubes of the tube bundle reactor and a negative pressure inside the reactor tubes, wherein the pressure reduction units are each associated with one of the reactor tubes and separately supply the reactor tubes, and control a substantially equal inflow of the starting material into individual reactor tubes and the reactor tubes are heated to a decomposition temperature of the starting material in at least a primary section of the reactor tubes, in which the starting material is pyrolyzed or thermolyzed and a pyrolysis or thermolysis product is obtained.

2. The method according to claim 1, wherein an inner surface of the reactor tubes in the primary section is inductively heated.

3. The method according to claim 1, wherein the starting material is pre-heated and evaporated at a temperature below the decomposition temperature.

4. The method according to claim 3, wherein the starting material is evaporated in a secondary section of the reactor tubes, and wherein the evaporated starting material is supplied from the secondary section to the primary section.

5. The method according to claim 1, wherein the decomposition in the primary section, preferably also the preheating and evaporation, the transfer of the starting material to the primary section, are operated continuously.

6. The method according to claim 1, further comprising solid deposits which are possibly produced as by-products by the pyrolysis or thermolysis are removed by elevating a temperature of an inner surface of the primary section for evaporation, decomposition or for burning-off of deposits.

TABLE

Heating experiment with water, induction power 10 kW:

| Experiment | Throughput per tube (kg/h) | Temperature at inlet, ° C. | Vapour phase between evaporator and thermolyzator, ° C. | Cracked gas temperature, ° C. | Inductor temperature, external ° C. | Volume loading, kg/m$^3$ sec | Surface loading, kg/m$^2$ sec |
|---|---|---|---|---|---|---|---|
| 1 | 1.16 | 26 | 210 | 495 | 123 | 33 | 8 |
| 2 | 0.92 | 28 | 205 | 505 | 118 | 27 | 7 |
| 3 | 0.72 | 29 | 189 | 510 | 125 | | |
| 4 | 0.68 | 32 | 193 | 512 | 130 | 20 | 5 |
| 5 | 0.63 | 26 | 125 | 508 | 132 | | |
| 6 | 0.52 | 27 | 180 | 515 | 127 | | |
| 7 | 0.51 | 25 | 197 | 480 | 115 | | |
| 8 | 0.49 | 27 | 205 | 535 | 129 | 14 | 4 |
| 9 | 0.1 | 24 | 198 | 520 | 117 | 3 | 1 |
| 10 | 0.1 | 23 | 189 | 535 | 123 | 118 | 35 |
| 11 | 0.1 | 28 | 197 | 555 | 118 | 472 | 141 |

7. The method according to claim 6, wherein the inner surface defines the substantially entire interior of a pyrolysis or thermolysis reactor.

8. The method according to claim 1, wherein the pyrolysis or thermolysis of the starting material takes place at the negative pressure of up to 500 hPa.

9. The method according to claim 1, wherein an inner surface of the reactor tubes at least in the primary section, is a surface of an iron body or the surface is iron or iron oxide.

10. The method according to claim 1, wherein an inner surface of the reactor tubes in the primary section is heated to a temperature below the decomposition temperature of at least 20° C., or to a temperature at which no solid by-products of the evaporation of the starting material are formed, in particular no polymerization products are formed.

11. The method according to claim 1, wherein a pressure resistance of the pressure reduction units is at least 800 hPa, wherein the pressure resistance at atmospheric pressure inside the reactor tubes prevents the inflow of starting material.

12. The method according to claim 1, wherein the negative pressure inside the reactor tubes is selected in such a manner so that the inflow of fluid into the reactor is between $1\times10^{-5}$ m$^3$/h and 1 m$^3$/h or between 0 and $1\times10^{-6}$ m$^3$/h when not operating.

13. A device for carrying out the method according to claim 1, with a pyrolysis or thermolysis reactor with a reactor bundle, a plurality of reactor tubes, with a starting material supply line, which is connected to the individual reactor tubes via a pressure reduction unit, wherein the reactor tubes are heatable and wherein the inside of the reactor tubes is operatively connected to a negative pressure pump, wherein the pressure reduction units control a substantially equal inflow of the starting material into individual reactor tubes.

14. The device according to claim 13, wherein the pressure reduction units are pressure regulators or capillaries having a pre-determined pressure resistance.

15. The device according to claim 13, wherein the reactor is suitable for the continuous introduction of starting material or removal of pyrolysis or thermolysis product.

16. The device according to claim 13, wherein at least a surface of the reactor tubes is inductively heated to at least 1000° C. wherein the reactor tubes comprise an iron body or an iron-containing surface.

17. The device according to claim 13, comprising a heatable evaporator, wherein a gas line leads from the evaporator into the reactor, and wherein the evaporator is a section in the tube bundle reactor.

18. The device according to claim 13, wherein at least a surface of the reactor tubes is inductively heated to at least 1300° C., wherein the reactor tubes comprise an iron body or an iron-containing surface.

19. The method according to claim 1, wherein the pyrolysis or thermolysis of the starting material takes place at negative pressure of up to 250 hPa.

20. The method according to claim 1, wherein the pyrolysis or thermolysis of the starting material takes place at the negative pressure in a range of 80 hPa to 200 hPa.

21. The method according to claim 1, wherein the inner surface of the reactor tubes at least in the primary section is a surface of an iron body, wherein the surface is iron or iron oxide.

22. The method according to claim 1, wherein the inner surface of the reactor tubes in the primary section is heated to a temperature below the decomposition temperature of at least 50° C. below the decomposition temperature or to a temperature at which no solid by-products of the evaporation of the starting material are formed.

23. The method according to claim 1, wherein the inner surface of the reactor tubes in the primary section is heated to a temperature below the decomposition temperature of at least 50° C. below the decomposition temperature and to a temperature at which no solid by-products of the evaporation of the starting material are formed.

24. A method for the thermolysis of a carboxylic acid amide, preferably of formamide to form HCN, in a tube bundle reactor having a plurality of reactor tubes and a pressure reduction unit associated with each of the reactor tubes, the method comprising: in a first series of process steps, carboxylic acid amide is brought in contact with heated surfaces of the reactor wherein the plurality of reactor tubes of the tube bundle reactor are loaded with equal quantities of carboxylic acid amide by the pressure reduction units associated with each of the reactor tubes, and wherein on the heated surfaces carboxylic acid amide is heated to its decomposition temperature and product-gas gas is continuously removed.

25. The method according to claim 24, wherein in a second series of process steps, without introducing carboxylic acid amide into the reactor the temperature is increased above the decomposition temperature in order to remove possibly formed solid deposits of by-products of the thermolysis by evaporation, decomposition or burning off.

26. The method according to claim 25, wherein for thermolysis, a surface of the reactor tubes is inductively heated to 430° C. to 600° C., preferably inductively.

27. The method according to claim 25, wherein for removal of by-products a surface of the reactor tubes is inductively heated to 700° C. to 1500° C.

* * * * *